United States Patent Office 3,822,241
Patented July 2, 1974

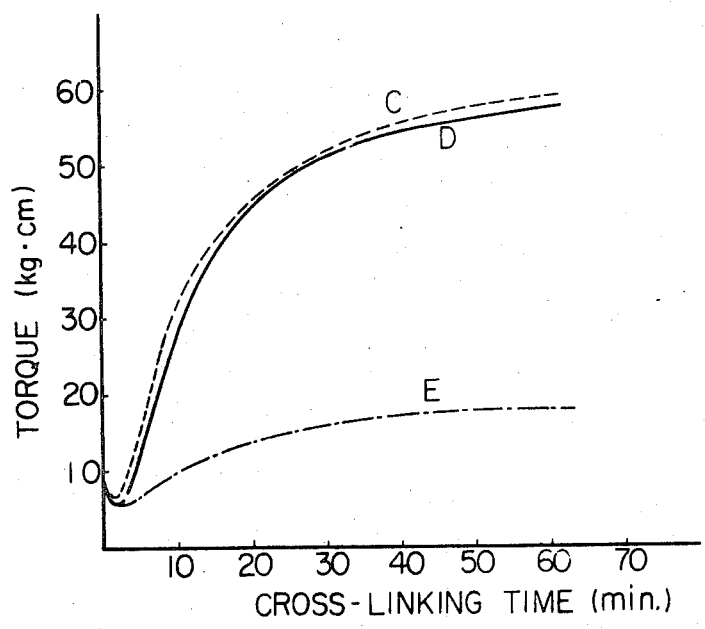

3,822,241
VULCANIZATION OF EPIHALOHYDRIN POLYMERS
Hiroshi Hani, Bunji Amemiya, Ginnosuke Tanaka, Hiroshi Kawahara, and Minoru Yamada, Kanagawa-ken, Japan, assignors to Asahi Glass Co., Ltd., Tokyo, Japan
Original application June 5, 1970, Ser. No. 43,691, now Patent No. 3,700,650. Divided and this application June 8, 1972, Ser. No. 261,040
Int. Cl. C08c *17/28;* C08d *13/28;* C08g *30/10*
U.S. Cl. 260—79
9 Claims

ABSTRACT OF THE DISCLOSURE

Epihalohydrin polymers, or epihalohydrin polymer-sulfur curable rubber systems, are vulcanized in the presence of a novel cross-linking formulation consisting essentially of (1) basic lead sulfate or basic lead sulfite, (2) at least one member selected from the group consisting of 2-mercaptoimidazolines, 2-mercaptopyrimidines, and thioureas, and (3) sulfur, if rubber is present.

BACKGROUND OF THE INVENTION

(1) Field of the Invention

This is a division of application Ser. No. 43,691, filed on June 5, 1970, and now Pat. No. 3,700,650.

This invention relates to a new process for vulcanizing epihalohydrin polymers. More particularly, this invention relates to a new process for vulcanizing an epihalohydrin polymer, comprising heating said polymer in the presence of a new cross-linking formulation which will be particularly described hereinafter. As used herein, the term "vulcanizing" or "vulcanization" includes not only the process of vulcanizing epihalohydrin polymers but also the process of covulcanizing an epihalohydrin polymer with a sulfur-curable rubber. The term "covulcanizing" refers to the vulcanization of blends or plies of two or more polymers to produce vulcanized polymer blends or laminates. The epihalohydrin polymers mentioned herein are homopolymers of epihalohydrins, copolymers of dissimilar epihalohydrins, and copolymers of an epihalohydrin with one or more other epoxides. The foregoing definitions apply to the description of the invention hereinbelow.

(2) Description of the Prior Art

Unlike the vulcanization of epoxide polymers containing double bonds, it is believed that epihalohydrin polymers are vulcanized by the halomethyl group being the side chain of the polymer molecule. However, the precise mechanism involved remains yet to be fully elucidated. It is for this reason that any search for a suitable vulcanizing agent or cross-linking formulation is a quite difficult task.

The conventional processes for the vulcanization of epihalohydrin polymers are disadvantageous, particularly, in such aspects as vulcanizing velocity, the thermal stability and non-colorability of the vulcanizate, etc.

As for any covulcanizing process for an epihalohydrin polymer-sulfur curable rubber system, the mechanism involved is more complicated than that of the vulcanization of an epihalohydrin polymer alone. Thus, it is not as easy as adding sulfur to the cross-linking formulation usable in the homo-vulcanizing process.

OBJECTS AND SUMMARY OF THE INVENTION

It is therefore an object of the invention to provide an improved vulcanizing process for epihalohydrin polymers.

It is a further object to provide a new vulcanizing process which enable epihalohydrin polymers to be vulcanized more rapidly than by conventional processes.

It is a still further object to provide a new vulcanizing process for epihalohydrin polymers, the vulcanizates being superior to the vulcanizates by conventional processes in thermal stability and/or mechanical properties.

A further object is to provide a covulcanizing method for epihalohydrin polymer-sulfur curable rubber systems, the improvements that can be realized being as set forth in the above description of the objects.

Further objects and advantages will become apparent as the disclosure proceeds.

Thus, this invention relates to a vulcanizing process which is characterized in that an epihalohydrin polymer is heated in the presence of a cross-linking formulation consisting of (1) at least one compound selected from the group consisting of basic lead sulfates and basic lead sulfites, (2) at least one agent selected from the group consisting of 2-mercaptoimidazolines, 2-mercaptopyrimidines, and thioureas, and, where said epihalohydrin polymer is covulcanized with sulfur-curable rubber, (3) sulfur.

In the vulcanizing process of this invention, which involves the use of a novel combination of compound (1) and agent (2) or, for said covulcanization, a novel combination of compound (1), agent (2) and sulfur (3), the epihalohydrin polymer is vulcanized at an unusually high vulcanizing velocity. In addition, the epihalohydrin polymer vulcanizate obtainable by the method of this invention features improvements in thermal stability and mechanical properties over those realized by the conventional methods.

BRIEF DESCRIPTION OF THE DRAWINGS

The sole figure shows the relation of cross-linking time in minutes to torque in kilogram·centimeters in the method described in Examples 5 and 13, with a control relation being also shown.

DETAILED DESCRIPTION OF THE INVENTION

The epihalohydrin polymers which can be vulcanized by the vulcanizing method of this invention include the homopolymers of epihalohydrins, the copolymers of dissimilar epihalohydrins, and the copolymers of any epihalohydrin with one or more other epoxides. Among the epihalohydrins are epichlorohydrin, epifluorohydrin, epibromohydrin and the like. The aforementioned other epoxides include, among others, ethylene oxide, propylene oxide, butene oxide, cyclohexene oxide, styrene oxide, butadiene monoxide, perfluoropropylene oxide, perfluoroethylene oxide, ethylglycidyl ether, 2-chloroethylglycidyl ether, allylglycidyl ether, etc. Those polymers may be readily prepared by polymerizing epihalohydrins, or copolymerizing epihalohydrins with the other epoxides with a catalyst which may for example be an organoaluminum compound. Particularly, effective catalysts for the polymerization of epihalohydrins or the copolymerization of epihalohydrin with other epoxides can be prepared by reacting the reaction product of a hydrocarbon-aluminum compound and a cyclic ether with an imide in the molar ratio of 1:0.1 to 1:1 on the basis of the hydrocarbon-aluminum compound used. Epihalohydrin polymers may be obtained either in amorphous state or in crystalline state, or in the form of a varying mixture of the two forms, depending upon the methods of polymerization used and, particularly, upon the types of catalyst employed. And the vulcanizing process of this invention is applicable to any of the above polymer forms. However, in order to produce a superior rubber of epihalohydrin polymer, it is generally preferable to employ a polymer in which both amorphous and crystalline polymers are present and the proportion of the crystalline polymer is in the range of about 5 to 15 percent. In addition, depending upon the polymerization method that may be chosen, the molecular weight of the resulting epihalohydrin polymer may be varied. And any of such polymers having varying molecular weights may be vulcanized by the process of this invention. However, in order to produce a particularly superior rubber, the molecular weight of the epihalohydrin polymer is preferably in the range of about 200 thousand to about 5 million. This molecular weight range corresponds to 1–10 dl./g. in reduced specific viscosity (RSV). The term RSV, which is a function of molecular weight, is used herein to designate the specific viscosity measured at 30° C. in a nitrobenzene solution containing 0.1 g. per 100 ml. of the polymer divided by the concentration of the solution.

Any sulfur-curable rubber can be vulcanized with one or more of the above epihalohydrin polymers in accordance with the vulcanizing process of this invention. Exemplary sulfur-curable rubbers are styrene-butadiene rubber, natural rubber, isoprene rubber, polychloroprene, acrylonitrile-butadiene rubber, isoprene-isobutylene rubber, ethylene-propylenediene terpolymer, cis-polybutadiene rubber, and cis-polyisoprene rubber, lower alkylene oxide-allylglycidyl ether copolymers such as propylene oxide-allylglycidyl ether copolymer.

In accordance with this invention, epihalohydrin polymers, or blends or plies of an epihalohydrin polymer with a sulfur-curable rubber, can be vulcanized or covulcanized by heating then in the presence of at least one of compounds (1) and at least one of agents (2) and, further, in the presence of a rubber, sulfur (3).

As has been previously stated, said compound (1) is any of the basic lead sulfates or basic lead sulfites.

We are the first to use basic lead sulfates and basic lead sulfite, in the vulcanization of rubbers. These compounds may be written as lead oxide plus a varying proportion of lead sulfate or sulfite and sometimes further plus a varying proportion of water. While those basic lead sulfates and basic lead sulfites may thus be formally written as an articulate system consisting of, for example, lead sulfate or lead sulfite, lead oxide and water, they are markedly different from those compounds, possessing entirely different physical and chemical properties as evidenced by X-ray diffraction, differential heat analysis and other analytical methods. In addition, basic lead sulfates and basic lead sulfites, unlike the formal components, or mixtures of these components, exhibit excellent vulcanizing effects when used in the vulcanization of epihalohydrin polymers. It is a particularly important advantage that with basic lead sulfates or sulfites, it is possible to obtain white vulcanizates which can hardly be manufactured with the use of conventional vulcanizing agents. As basic lead sulfates and basic lead sulfites, any di, tri and poly-basic lead sulfates or sulfites may be employed.

To cross-link an epihalohydrin polymer, any of the 2-mercaptoimidazolines having the general formula:

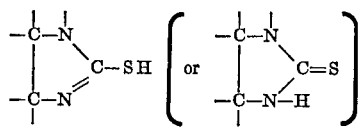

can be successfully used. Among the 2-mercaptoimidazolines that can thus be used are 2-mercaptoimidazoline, 4-methyl-2-mercaptoimidazoline and 5-ethyl-4-butyl-2-mercaptoimidazoline.

For the same cross-linking purpose, any of the 2-mercaptopyrimidines having the following general formula:

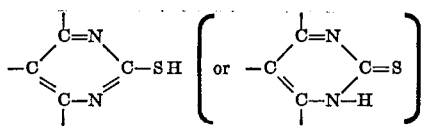

can be used. Among the 2-mercaptopyrimidines that can be used are 2-mercaptopyrimidine, 4,6-dimethyl-2-mercaptopyrimidine, 5'-butyl-2-mercaptopyrimidine and 4-ethyl-5-propyl-2-mercaptopyrimidine.

Any thiourea having the general formula:

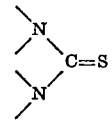

may be employed. Thus, diethylthiourea, dibutylthiourea, trimethylthiourea, propylenethiourea may be mentioned by way of example.

The 2-mercaptoimidazolines and 2-mercaptopyrimidines are especially preferred. When an epihalohydrin polymer is vulcanized with use of such a cross-linking formulation of this invention as described above, the amount of the cross-linking formulation may be selected over a wide range with the optimum amount depending upon the type of epihalohydrin, sulfur-curable rubber present, the type of the cross-linking formulation, the desired degree of cross-linking and other factors. Usually, the amount of the cross-linking formulation may be such that the compound (1) is in the range of from about 0.1 to about 30 part(s) by weight and the agent (2) in the range of from about 0.2 to about 7 part(s) by weight, per 100 parts by weight of the epihalohydrin polymer. In case an epihalohydrin polymer is covulcanized with a sulfur-curable rubber, the amount of sulfur (3) to be added as a supplement is preferably in the range of from about 0.2 to about 7 parts by weight on the same basis.

It may be desirable, in some cases, to add auxiliary or secondary accelerators. Among such secondary accelerators are guanidines, such as diorthotolyl guanidine, thiazoles such as mercaptobenzothiazoles, and certain amine based accelerators such as butyraldehyde-aniline condensate.

In the covulcanization of an epihalohydrin-sulfur-curable rubber system, the covulcanizable composition may be either a blend or a ply. In such a covulcanizable blend, the proportion of the epihalohydrin polymer may vary over a wide range, the determining factor being the properties desired in the vulcanizate.

In general, the amount of the epihalohydrin polymer may vary within the range of from about 20 to about 90 percent by weight of the blend. Such a blend may be prepared by any of the conventional rubber blending methods. For example, a two-roll mill may be used to blend an epihalohydrin polymer with a sulfur-curable rubber.

The components of the cross-linking composition, and the stabilizer if one is used, can be incorporated in or admixed with the polymer or blend in any desired manner. For example, they can be uniformly blended with the polymer or blend by milling in a Banbury mixer. By such a method, the cross-linking components may be evenly distributed throughout the polymer or blend.

In the case of covulcanizable plies to form laminates, the cross-linking components will be blended individually with the polymer and rubber before they are laid up. In any case, cross-linking takes place when the vulcanizable or covulcanizable composition is subjected to heat. The conditions under which cross-linking is accomplished can be varied within broad limits. Generally, the cross-linking temperature is in the range of about 100° C. to about 220° C. The cross-linking time varies inversely with the temperature and may range from about 2 minutes to about 5 hours. Cross-linking is generally conducted in metal molds under a pressure of about 10 to about 200 atms.

In addition to the cross-linking components, other ingredients may also be incorporated. The additives normally employed in the vulcanization of rubber can be employed for the present purposes. Thus, for example, use may be made of various extenders such as stearic acid, lauric acid and the zinc and sodium salts thereof, etc.; fillers such as carbon black, white carbon, etc.; antioxidants such as phenyl-$\beta$-naphthylamine, di-$\beta$-naphthyl-p-phenyleneamine, sym-di-$\beta$-naphthyl-p-phenylenediamine, N-isooctyl-p-aminophenol, the reaction product of diphenylamine and acetone, polymerized trimethyldihydroquinoline, 4,4-bis(6-tert-butyl-m-cresol), the reaction product of crotonaldehyde and 3-methyl-6-tert-butylphenol, nickel dibutyldithiocarbamate, the zinc salt of 2-mercaptobenzimidazole, etc.; pigments, plasticizers, stabilizers, softeners, etc. The vulcanizates, particularly those containing reinforcing fillers and antioxidants, exhibit properties useful in applications requiring oil resistance, heat and flame resistance, solvent resistance, ozone resistance, and low temperature flexibility. Obviously there are cases in which no additive is required or desired, excellent results being achieved with the cross-linking components alone.

The following examples are given for illustrative purposes only. It is obvious that many modifications and changes may be made without departing from the scope and spirit of the invention described and claimed. In the examples, all parts are by weight.

Examples 1–16

In the following examples, an epichlorohydrin polymer having a RSV value of 12 (as determined in nitrobenzene at 30° C.) was made up into the following composition.

| | Parts |
|---|---|
| The polymer | 100 |
| Zinc stearate | 1 |
| Nickel dibutyldithiocarbamate | 1 |
| Fast extrusion furnace black (FEF) | 50 |
| Cross-linking agent | |
|     Compound (1) | Varied |
|     Agent (2) | 1.5 |

The above composition was milled on a two-roll mill for 20 minutes (2 rolls, 8" dia. and 20" long; 17 r.p.m. front roll, 20 r.p.m. rear roll; the front roll maintained at 70° C. and the rear roll at 80° C.). The composition was then vulcanized according to JIS–k–6300 (Japanese Industrial Standard). The physical properties of each vulcanizate were measured by the methods specified by JIS–k–6300. The standard vulcanization was conducted at 155° C. 70 kg./cm.$^2$ for 45 minutes, and the post-vulcanization was effected at 168° C. and atmospheric pressure for 5 hours. An aging test was conducted at 150° C. for 72 hours, using a test-tube type aging tester as specified by JIS–k–6300.

In the Tables below, $T_B$ and $E_B$ denote tensile strength (kg./cm.$^2$) and elongation (at break) (percent), respectively. Percent change means the change in percentage relative to the corresponding physical property of the standard vulcanizate.

The vulcanizing velocities were measured with a Disk-Rheometer (built by Toyo Seiki K.K., L-rotor type, rotary reciprocating motion±3°, 6 cycles per min.) at 155° C. for Examples 5 and 13 and Control 4. Those velocities are shown by curves (C), (D), and (E), respectively, in the drawing. In the measurement, the lowest torque reading after the input of the sample was assumed to be the cross-linking start time, and the change in torque (kg.cm.) was measured and plotted against cross-linking time (min.). Basic lead sulfate (3PbO·PbSO$_4$·½H$_2$O) and basic lead sulfite (PbO·PbSO$_3$·½H$_2$O) were used as compounds (1). The results are set forth in Table 1-(i)–Table 1-(iv).

TABLE 1-(i)

| | Cross-linking formulation | | | Standard vulcanizate | | | | | | |
|---|---|---|---|---|---|---|---|---|---|---|
| | | | | | | Modulus (kg./cm.$^2$) | | | | |
| | Compound (1) | Parts | Agent (2) | $T_B$ | $E_B$ | 50% | 100% | 200% | 300% | 400% |
| Example No.: | | | | | | | | | | |
| 1 | Tribasic lead sulfate | 8 | Diethylthiourea | 114 | 600 | 21.4 | 41.7 | 70.0 | 93.3 | 106 |
| 2 | do | 5 | do | 108 | 578 | 27.3 | 42.5 | 69.0 | 92.4 | 106 |
| 3 | do | 8 | do | 102 | 568 | 26.0 | 38.4 | 64.0 | 88.0 | 99.1 |
| 4 | do | 2 | 2-mercaptoimidazoline | 130 | 370 | 30.4 | 54.3 | 100 | 118 | |
| 5 | do | 5 | do | 158 | 250 | 47.6 | 92.5 | 148 | | |
| 6 | do | 8 | do | 149 | 227 | 43.3 | 77.9 | 141 | | |
| 7 | do | 5 | Trimethylthiourea | 132 | 395 | 27.3 | 59.7 | 106 | 126 | |
| 8 | do | 5 | Hexamethylene diamine carbamate | 167 | 355 | 36.0 | 64.7 | 129 | | |
| 9 | Basic lead sulfite | 2 | Diethylthiourea | 106 | 555 | 30.5 | 42.0 | 75.0 | 73.4 | 101 |
| 10 | do | 5 | do | 89.8 | 513 | 28.5 | 39.6 | 66.4 | 85.4 | 89.4 |

TABLE 1-(ii)

| | Cross-linking formulation | | | Standard vulcanizate | | | | | | |
|---|---|---|---|---|---|---|---|---|---|---|
| | | | | | | Modulus (kg./cm.$^2$) | | | | |
| | Compound (1) | Parts | Agent (2) | $T_B$ | $E_B$ | 50% | 100% | 200% | 300% | 400% |
| Example No.: | | | | | | | | | | |
| 11 | Basic lead sulfite | 8 | Diethylthiourea | 85.9 | 514 | 29.5 | 38.8 | 63.9 | 80.0 | 92.3 |
| 12 | do | 2 | 2-mercaptoimidazoline | 146 | 373 | 29.8 | 37.4 | 107 | 136 | |
| 13 | do | 5 | do | 151 | 285 | 35.8 | 66.7 | 128 | | |
| 14 | do | 8 | do | 159 | 247 | 37.5 | 75.0 | 143 | | |
| 15 | do | 5 | Trimethylthiourea | 135 | 412 | 26.0 | 49.8 | 107 | 127 | 132 |
| 16 | do | 5 | Hexamethylene diamine carbamate | 166 | 341 | 30.8 | 63.1 | 123 | 160 | |
| Control No.: | | | | | | | | | | |
| 1 | Lead sulfide | 5 | 2-mercaptoimidazoline | 123 | 335 | 23.0 | 38.9 | 85.4 | 118 | |
| 2 | Lead chromate | 5 | do | 144 | 337 | 33.0 | 66.8 | 119 | 141 | |
| 3 | Lead metaborate | 5 | do | 128 | 228 | 26.2 | 46.1 | 94.8 | 141 | |
| 4 | None | 0 | do | 126 | 290 | | | | | |
| 5 | None | 0 | Hexamethylene diamine carbamate | 148 | 481 | 33.4 | 53.8 | 101 | 127 | |

TABLE 1-(iii)

| | Post-vulcanizate | | | | | | Aged vulcanizate | | | | |
|---|---|---|---|---|---|---|---|---|---|---|---|
| | $T_B$ (percent change) | $E_B$ (percent change) | Modulus (kg./cm.²) | | | | $T_B$ (percent change) | $E_B$ (percent change) | Modulus (kg./cm.²) | | |
| | | | 50% | 100% | 200% | 300% | | | 50% | 100% | 200% |
| Example No.: | | | | | | | | | | | |
| 1 | 136 (−11.3) | 316.5 (−49.2) | 29.8 | 51.8 | 112 | 148 | 91.2 (−22.6) | 332 (−47.7) | 31.0 | 44.9 | 59.3 |
| 2 | 145 (+33.8) | 386 (−33.2) | 34.1 | 58.4 | 112 | 139 | 106 (−3.2) | 274 (−53.2) | 36.9 | 58.9 | 99.6 |
| 3 | 160 (+55.5) | 347 (−39.3) | 36.9 | 60.7 | 122 | 156 | 153 (+46.3) | 213 (−62.8) | 46.5 | 81.9 | |
| 4 | 157 (+17.7) | 218 (−42.5) | 37.4 | 78.0 | | | 120 (−12.0) | 222 (−42.1) | 30.3 | 57.5 | 117 |
| 5 | 163 (+1.2) | 152.5 (−40.3) | 48.3 | 99.2 | | | 174 (+8.6) | 168 (−33.6) | 46.1 | 90.0 | |
| 6 | 57 (+4.4) | 142 (−32.6) | 57.3 | 119 | | | 171 (+13.1) | 135 (−40.0) | 66.6 | 138 | |
| 7 | 171 (+27.6) | 199 (−48.6) | 41.0 | 95.0 | | | 107 (−20.0) | 210 (−46.6) | 34.8 | 64.7 | 107 |
| 8 | 196 (+18.6) | 289 (−16.8) | 38.3 | 74.1 | | | 60.0 (−63.9) | 322 (−7.6) | | | |
| 9 | 144 (+37.8) | 353 (−37.3) | 36.8 | 66.0 | 118 | 141 | 97.3 (−7.1) | 306 (−45.3) | 39.3 | 62.0 | 95.0 |
| 10 | 133 (+46.5) | 347 (−33.5) | 38.1 | 57.6 | 106 | 126 | 116 (+29.8) | 289 (−45.1) | 43.7 | 67.7 | 131 |

TABLE 1-(iv)

| | Post-vulcanizate | | | | | | Aged vulcanizate | | | | |
|---|---|---|---|---|---|---|---|---|---|---|---|
| | $T_B$ (percent change) | $E_B$ (percent change) | Modulus (kg./cm.²) | | | | $T_B$ (percent change) | $E_B$ (percent change) | Modulus (kg./cm.²) | | |
| | | | 50% | 100% | 200% | 300% | | | 50% | 100% | 200% |
| Example No.: | | | | | | | | | | | |
| 11 | 147 (+59.2) | 366 (−28.3) | 41.8 | 64.0 | 113 | 138 | 164 (+89.0) | 213 (−58.3) | 62.4 | 108 | |
| 12 | 185 (+27.2) | 224 (−40.0) | 42.5 | 93.7 | 151 | | 144 (−3.0) | 231 (−39.1) | 38.3 | 76.6 | 236 |
| 13 | 179 (+16.2) | 172 (−38.3) | 49.0 | 103 | | | 177 (+13.9) | 170 (−40.3) | 56.7 | 113 | |
| 14 | 181 (+14.1) | 159 (−31.5) | 55.6 | 230 | | | 177 (+10.0) | 147 (−38.3) | 68.0 | 150 | |
| 15* | 167 (+23.7) | 224 (−48.4) | 46.6 | 85.0 | | | 19.4 (−85.6) | 379 (−12.0) | 12.7 | 148 | 19.4 |
| 16 | 194 (+16.3) | 272 (−20.3) | 44.6 | 85.5 | 160 | | 89.1 (−46.5) | 305 (−10.7) | | | |
| Control No.: | | | | | | | | | | | |
| 1 | 135 (+9) | 166 (−45.4) | 35.7 | 78.5 | | | 121 (−1.6) | 147 (−53.0) | 36.5 | 80.4 | |
| 2 | 151 (+4.8) | 174 (−48.4) | 43.0 | 91.0 | | | 142 (−1.0) | 155 (−53.2) | 46.6 | 89.1 | |
| 3 | 160 (+24.9) | 198 (−12.6) | 45.1 | 86.4 | | | 144 (+1.3) | 205 (−11.2) | 34.1 | 69.6 | |
| 4 | 150 (+19.0) | 270 (−9.3) | | | | | 11.8 (−8.0) | 250 (−13.8) | | | |
| 5 | 118 (−21.3) | 401 (−18.0) | 34.5 | 46.5 | 77.5 | | 33.6 (−77.4) | 342 (−28.9) | | | |

*The aging test was carried out at 150° C. for 192 hours.

Examples 17–21

Epichlorohydrin polymer (RSV 12 as determined in nitrobenzene at 30° C.) and styrene-butadiene rubber (Japan Synthetic Rubber, Ltd., "TSR-1500") were covulcanized. A master batch of epichlorohydrin polymer was prepared by milling 100 parts of said epichlorohydrin polymer, 50 parts FEF carbon black and, 1 part of zinc stearate at 60–70° C. for 10 minutes. In a similar manner, 100 parts styrene-butadiene rubber, 50 parts FEF carbon black and 1 part zinc stearate were milled to prepare a master batch of SBR. The above master batches were mixed on the two-roll mill for 5 minutes, at the end of which time various additives were added. The final compositions are given in Table 2. Each mixture was further milled for about 5 minutes.

The physical properties of the vulcanizates are shown in Table 3. The physical properties of the same vulcanizates after aging at 150° C. for 72 hours are shown in Table 4.

TABLE 2

| Recipe | Control No. | | Example No. | | | | |
|---|---|---|---|---|---|---|---|
| | 1 | 2 | 17 | 18 | 19 | 20 | 21 |
| Epichlorhydrin polymer | 50 | 50 | 100 | 50 | 50 | 25 | |
| Styrene-butadiene rubber | 50 | 50 | | 50 | 50 | 75 | 100 |
| Tribasic sulfate | | | 5.0 | 5.0 | 2.5 | 5.0 | 5.0 |
| 2-mercaptoimidazoline | | 1.5 | 1.5 | 1.5 | 1.5 | 1.5 | 1.5 |
| Diethyl thiourea | 2.0 | | | | | | |
| FEF-carbon black | 50 | 50 | 50 | 50 | 50 | 50 | 50 |
| Zinc stearate | 1.0 | 1.0 | 1.0 | 1.0 | 1.0 | 1.0 | 1.0 |
| Stearic acid | 0.5 | 0.5 | | 0.5 | 0.5 | | 1.0 |
| Zinc oxide | | | | | 2.5 | | |
| Polymerized trimethyl dithioquinoline | 1.0 | 1.0 | 1.0 | 1.0 | 1.0 | 1.0 | 1.0 |
| Sulfur | 1.5 | 1.5 | 1.0 | 1.5 | 1.5 | 1.8 | 2.0 |

TABLE 3

| Physical properties | Control No. | | Example No. | | | | |
|---|---|---|---|---|---|---|---|
| | 1 | 2 | 17 | 18 | 19 | 20 | 21 |
| Tensile strength (kg./cm.²) | 117 | 77.8 | 177 | 208 | 200 | 184 | 202 |
| Elongation at break (percent) | 550 | 500 | 370 | 290 | 345 | 270 | 410 |
| Modulus at 50% (kg./cm.²) | 13.7 | 10.1 | 37.6 | 41.5 | 18.5 | 30.3 | 14.8 |
| Modulus at 100% (kg./cm.²) | 24.2 | 17.1 | 72.8 | 76.0 | 41.0 | 65.8 | 27.8 |
| Modulus at 200% (kg./cm.²) | 51.6 | 36.1 | 135 | 154 | 107 | 142 | 82.4 |
| Modulus at 300% (kg./cm.²) | 80.6 | 52.4 | 162 | | 171 | | 134 |

TABLE 4

| Physical properties | Control No. | | Example No. | | | | |
|---|---|---|---|---|---|---|---|
| | 1 | 2 | 17 | 18 | 19 | 20 | 21 |
| Tensile strength (kg./cm.²) | 28.1 | 33.5 | 171 | 55.4 | 43.6 | 73.9 | 47.5 |
| Percent change | −76 | −57 | −3.4 | −73 | −78 | −60 | −76 |
| Elongation at break (percent) | 17 | 17 | 100 | 10 | 10 | 20 | 10 |

We claim:

1. A process of vulcanizing a polymer of an epihalohydrin which comprises heating said polymer at about 100° to about 220° C. under a pressure of about 10 to about 200 atmospheres in the presence of a cross-linking formulation until vulcanized, said formulation essentially consisting of about 0.1 to about 30 parts of a lead compound selected from the group consisting of basic lead sulfate and basic lead sulfite, and of about 0.2 to about 7 parts of a sulfur-bearing agent selected from the group consisting of a 2-mercaptoimidazoline, a 2-mercaptopyrimidine, and a thiourea, said parts being by weight per 100 parts of said epihalohydrin polymer.

2. A process according to claim 1, wherein said epihalohydrin polymer is a polymer of epichlorohydrin.

3. A process according to claim 1, wherein said epihalohydrin polymer is a copolymer of ethylene oxide and epichlorohydrin.

4. A process according to claim 1, wherein said agent is a 2-mercaptoimidazoline.

5. The process of claim 1, wherein said agent is a thiourea.

6. A process as set forth in claim 4, wherein said lead compound is basic lead sulfite.

7. A process as set forth in claim 6, wherein said sulfur-bearing agent is 2-mercaptoimidazoline, and said polymer is a polymer of epichlorohydrin.

8. A process as set forth in claim 1, wherein said lead compound is basic lead sulfite.

9. A process of vulcanizing a polymer of epichlorohydrin which comprises heating said polymer at about 100° to about 220° C. under a pressure of about 10 to about 200 atmospheres in the presence of a cross-linking formulation until vulcanized, said formulation essentially consisting of about 0.1 to about 30 parts of basic lead sulfite and of about 0.2 to about 7 parts of 2-mercaptoimidazoline, said parts being by weight per 100 parts of said polymer.

References Cited

UNITED STATES PATENTS

| | | | |
|---|---|---|---|
| 3,341,491 | 9/1967 | Robinson et al. | 260—2 A |
| 2,996,473 | 8/1961 | Cain et al. | 260—79 |

WILBERT J. BRIGGS, SR., Primary Examiner

U.S. Cl. X.R.

156—306; 161—184, 239, 247, 255; 260—2 A, 2 EP, 3, 37 EP, 41.5 R, 45.9 NC, 45.9 P, 45.95, 37 AL, 836, 837 R, 874, 887, 888, 889, 897 R

UNITED STATES PATENT OFFICE
CERTIFICATE OF CORRECTION

Patent No. 3,822,241　　　　　　Dated July 2, 1974

Inventor(s) HIROSHI HANI ET AL

It is certified that error appears in the above-identified patent and that said Letters Patent are hereby corrected as shown below:

In the heading, after "261,040" (6th line after the title), insert --

Claims priority, application Japan, June 12, 1969, 44/45,749; Sept. 5, 1969, 44/70,411; Oct. 14, 1969, 44/81,565; Oct. 28, 1969, 44/85,673; Dec. 9, 1969, 44/98,363 --

Signed and sealed this 5th day of November 1974.

(SEAL)
Attest:

McCOY M. GIBSON JR.　　　　　　　C. MARSHALL DANN
Attesting Officer　　　　　　　　Commissioner of